(12) United States Patent
Knaebchen et al.

(10) Patent No.: US 7,024,198 B2
(45) Date of Patent: Apr. 4, 2006

(54) METHOD FOR EXPEDITING A SHORT MESSAGE VIA A SERVER WHEN A COMMUNICATION PARTICIPANT OF A COMMUNICATION NETWORK IS NOT AVAILABLE

(75) Inventors: Andreas Knaebchen, Munich (DE); Volker Petersen, Geretsried (DE)

(73) Assignee: Siemens Aktiengellschaft, Munich (DE)

( * ) Notice: Subject to any disclaimer, the term of this patent is extended or adjusted under 35 U.S.C. 154(b) by 0 days.

(21) Appl. No.: 10/487,529

(22) PCT Filed: Aug. 14, 2002

(86) PCT No.: PCT/EP02/09145

§ 371 (c)(1),
(2), (4) Date: Feb. 23, 2004

(87) PCT Pub. No.: WO03/019922

PCT Pub. Date: Mar. 6, 2003

(65) Prior Publication Data

US 2004/0259550 A1    Dec. 23, 2004

(30) Foreign Application Priority Data

Aug. 23, 2001 (EP) .................................. 01120255

(51) Int. Cl.
*H04Q 7/20* (2006.01)

(52) U.S. Cl. ..................... 455/445; 455/422.1; 370/352

(58) Field of Classification Search ............. 455/422.1; 370/352, 328; 713/201
See application file for complete search history.

(56) References Cited

U.S. PATENT DOCUMENTS

| 5,668,862 | A | 9/1997 | Bannister et al. |
| 5,806,000 | A | 9/1998 | Vo et al. |
| 5,930,700 | A | 7/1999 | Pepper et al. |
| 5,999,611 | A | 12/1999 | Tatchell et al. |
| 6,847,632 | B1 * | 1/2005 | Lee et al. ................... 370/352 |
| 2002/0152402 | A1 * | 10/2002 | Tov et al. ................... 713/201 |
| 2002/0176378 | A1 * | 11/2002 | Hamilton et al. ........... 370/328 |

FOREIGN PATENT DOCUMENTS

| WO | WO 00/05861 | 2/2000 |
| WO | WO 01/20888 | 3/2001 |
| WO | WO 01 78360 | 10/2001 |

* cited by examiner

Primary Examiner—Sonny Trinh
Assistant Examiner—Phuoc Doan
(74) Attorney, Agent, or Firm—Morrison & Foerster

(57) ABSTRACT

The invention relates to a method for emitting signal when a communication participant is not available on a subscriber station (SUB2) of a first partial network (NET1), especially a fixed network, associated with a communication network, once a call has arrived that was destined for the respective subscriber station, to a defined station of a second partial network (NET2), especially Internet, associated with the mentioned communication network which is linked with the first partial network (NET1) via at least one transition device (GW), and wherein communication links from and to a mobile radio device (MOF) associated with the respective communication participant can be established as radio links. According to the invention, a short message signal is transmitted to the defined station of the respective second partial network (NET2), via call redirection from the mentioned subscriber station (SUB2) to a server (SVR) associated with the second partial network (NET2) and by means of an information service defined in said server (SVR), said message comprising at least the subscriber number of the calling subscriber station (SUB1).

12 Claims, 1 Drawing Sheet

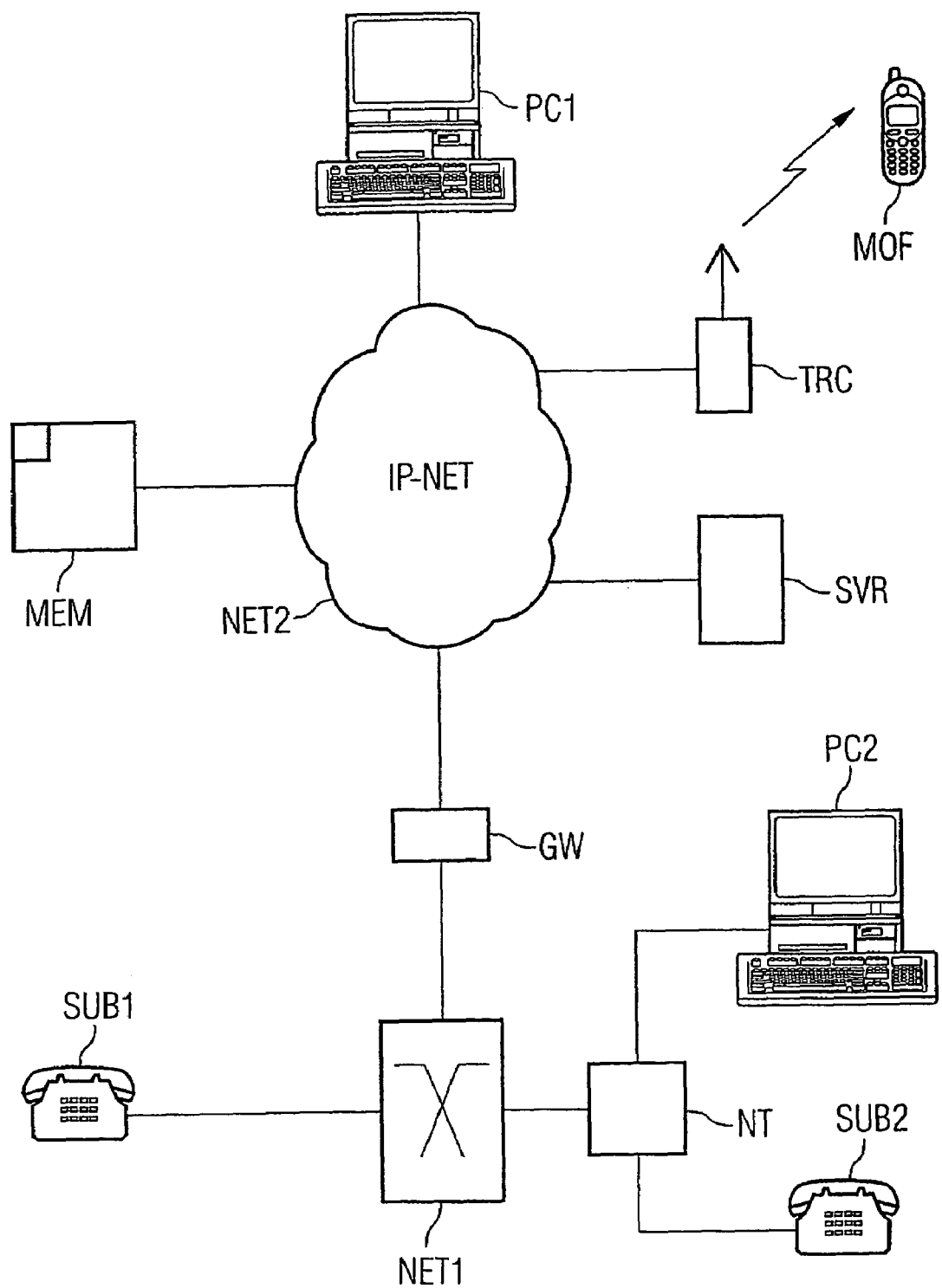

METHOD FOR EXPEDITING A SHORT MESSAGE VIA A SERVER WHEN A COMMUNICATION PARTICIPANT OF A COMMUNICATION NETWORK IS NOT AVAILABLE

CLAIM FOR PRIORITY

This application claims priority to International Application No. PCT/EP02/09145, which was published in the German language on Mar. 6, 2003, which claims the benefit of priority to Germany Application No. EP 01120255.3 which was filed in the German language on Aug. 23, 2001.

TECHNICAL FIELD OF THE INVENTION

The invention relates to a method for emitting a signal when a communication participant is not available

BACKGROUND OF THE INVENTION

Generally, when a communication participant is not available at a subscriber station of a communication network of the type considered above, a signal is emitted to any other switching center of the respective communication network, at which the respective communication participant is henceforth available. This known method, also referred to as call signal redirection, means that all calls that have not been accepted at the first mentioned switching center of the respective communication network are directed to the respective other subscriber station of the communication network. Additionally, these calls result in the emission of corresponding acoustic report signals (bell characters) at the respective other subscriber station. This is sometimes experienced as disruptive, especially when the communication participant mentioned is available by mobile radio in the communication network. This situation is also experienced as especially unfavorable, when the respective communication participant is traveling abroad with their mobile radio device.

In order to remedy the problem set out above, it is generally known that a "mailbox function" or "call answer function" can be activated for the switching center of the respective communication network, at which the communication participant mentioned was hitherto available. The messages stored by activation of the functions just mentioned can then be retrieved by the respective communication participant by remote inquiry. This however assumes that a corresponding message has been transmitted by the respective calling communication participant. If however the respective calling communication partner has not left a message but canceled the link again shortly after it was established, there is no information available that can be evaluated for the mentioned remote inquiry, i.e. no subscriber number of the respective calling communication participant.

SUMMARY OF THE INVENTION

The invention relates to a method for emitting a signal when a communication participant is not available at a subscriber station of a first subnetwork, especially a fixed network, associated with a communication network, following arrival of a call, destined for the respective subscriber station, to a defined station of a second subnetwork associated with the mentioned communication network, especially an IP network, which is linked to the first subnetwork via at least one transition device and wherein communication links from and to a mobile radio device associated with the respective communication participant can be established as radio links.

The invention illustrates a method in which a signal can be emitted relatively simply to another subscriber station or station of the respective communication network when a communication participant is not available at a subscriber station of a communication network, once a call has arrived that was destined for the respective subscriber station, to inform the station or subscriber station of the respective call made, without in the meantime emitting acoustic report signals at the station or subscriber station in the hitherto conventional manner.

within one embodiment of the invention, there is a method in which a defined information service is established in a server associated with the specified second subnetwork that can be activated in response to call signal redirection from the first subnetwork to the respective server, redirection information specifying the subscriber station of the first subnetwork, to which the respective server is assigned for call signal redirection, is stored in the first subnetwork, the redirection information is used to redirect call signal information from a calling subscriber station to the subscriber station of the first subnetwork as a subscriber station to be called then in the context of call signal redirection to the server of the second subnetwork, if the call is not accepted at the specified subscriber station to be called, and a short message signal comprising at least the subscriber number of the calling subscriber station is transmitted from the respective server in the context of the information service established for the mentioned station to the respective defined station.

The invention has one advantage that adequate information about the respective calling subscriber station can be provided in a relatively simple manner at a required station of the communication network by the short message transmitted thereto. This includes at least the subscriber number of the respective calling subscriber station, without having to be subject to the disadvantage set out above of disruption due to the emission of acoustic report signals, as occur with conventional call signal redirection.

Preferably, with the method according to the invention, call signal redirection takes place immediately after the call has not been accepted at a mentioned subscriber station to be called.

It is, however, possible for the respective call signal redirection to take place at a defined time period after non-acceptance of the call at the mentioned subscriber station to be called, or to take place after a defined number of call signals has been emitted to the mentioned subscriber station to be called. In these two cases, a communication participant at the respective subscriber station to be called has the option of taking an incoming call despite the fact that call signal redirection is established.

Short messages (e.g. known as SMS) are also expediently transmitted with the short message signal transmitted with the method according to the invention to the mentioned mobile radio device as the station which is defined in the mentioned server as the station for the receipt of the respective short message signal.

As an alternative, or in addition to the last considered measure, according to a further advantageous embodiment of the invention, an email can be sent to a previously defined electronic mailbox as the short message signal. This offers the advantageous option of accessing the respective electronic mailbox from a subscriber station of the communication network equipped with a PC function and retrieving the respective short message signal stored electronically there, which comprises at least the subscriber number of the respective calling subscriber station.

As an alternative, or in addition to the last considered two advantageous developments of the method according to the invention, it is also possible to store the short message signal in a server memory. In this way, the calls being made to a station or subscriber station of the communication network while the call signal redirection operation is established can accumulate in the respective server memory and be retrieved in their entirety from any switching center or station of the communication network.

Preferably, a selection is made in respect of the subscriber numbers of calling subscriber stations in response to the establishment of the mentioned defined information service in the mentioned server. A positive selection preferably takes place for this purpose, according to which a short message signal is transmitted in response to calls with defined subscriber numbers or alternatively a negative selection is made, according to which a short message signal is not transmitted in response to calls with defined subscriber numbers. In each case, the quantity of information occurring as a result of the transmission of short message signals can be limited in a desirable manner. Also, a rough selection can be made by predefining partial numbers, i.e. not complete subscriber numbers but only a part of such subscriber numbers.

Advantageously, the redirection information occurring in the server within a defined time period is retrieved from any subscriber station of the communication network. This allows a time-classified history of calls occurring.

The subscriber number of a calling subscriber station is advantageously included in the short message transmitted to the mentioned defined station in the course of the established information service to set up a link from the station receiving this short message, in particular a mobile radio subscriber station, to the respective calling subscriber station. This function, known as the click-to-dial function, allows a link to be established in an especially user-friendly manner between the mentioned station and the respective subscriber station that called originally.

BRIEF DESCRIPTION OF THE DRAWINGS

The invention is described in an exemplary manner below with reference to a drawing.

FIG. 1 illustrates a communication network having two subnetworks.

DETAILED DESCRIPTION OF THE INVENTION

FIG. 1 shows a communication network, with which two subnetworks NET1 and NET2 are associated. The one subnetwork NET1 is provided by a network that can, for example, be a fixed network, such as the commercially available switching system EWSD. The respective network NET1 can, however, also be an IP network, i.e. an internet protocol based network. The other, second network NET2 is provided by an internet protocol based network IP-NET that is linked to the first-mentioned subnetwork NET1 via at least one transition device (gateway) GW. The second subnetwork NET2 can, for example, be the currently available internet.

Linked to the network NET1 representing the first subnetwork of the communication network are a plurality of subscriber stations of which two subscriber stations SUB1 and SUB2 are shown in FIG. 1. The subscriber station SUB1 can, for example, be an analog subscriber station and the subscriber station SUB2 can, for example, be an ISDN subscriber station that is linked via a network termination device NT to the subnetwork NET1. A personal computer PC2 can also be associated with the subscriber station SUB2, which is also linked via the network termination device NT to the subnetwork NET2.

A plurality of subscriber stations can also be linked to the second subnetwork NET2. In the present case, a personal computer PC1, a server SVR, a separate memory unit MEM and a transceiver device TRC are shown, via which radio links can be established to and from mobile radio devices that represent mobile communication participant stations. Only one such mobile radio device MOF is shown in the drawing.

After the communication network shown in FIG. 1, and the devices linked thereto have been described to an adequate extent for an understanding of the present invention, it is intended to describe the method according to the invention. In this context, it is assumed that a link is to be established from the subscriber station SUB1 as a calling subscriber station via the subnetwork NET1 to the subscriber station SUB2. The communication participant normally available at the subscriber station SUB2 should be assumed to be no longer available there but is currently available via the mobile radio device MOF shown in FIG. 1.

In order for the communication participant, with which the mobile radio device MOF is associated, to be informed of the calls that are routed to the subscriber station SUB2, the procedure is as follows. First, a defined information service is established in the server SVR associated with the second subnetwork NET2 and this defines call signal redirection from the first subnetwork NET1 to a defined station of the second subnetwork NET2. In the present case, the station mentioned is the mobile radio device MOF. The respective defined information service can thereby be established, for example, from the personal computer PC1 linked to the first subnetwork NET1 or from the personal computer PC2 linked to the second subnetwork NET2. It is, however, also possible for the respective defined information service to be established in the server SVR by means of the mobile radio device MOF via the transceiver device TRC and the second subnetwork NET2.

As well as establishing the mentioned defined information service in the server SVR in this way, redirection information is also stored in the first subnetwork NET1 to the effect that the subscriber station SUB2 of this first subnetwork is assigned to the server SVR. The respective redirection information can be stored for this purpose in the signaling control area of the first subnetwork NET1.

If a call, for example, from the subscriber station SUB1 as a calling subscriber station now arrives at the subscriber station SUB2 and this call cannot be accepted at the subscriber station SUB2 as a subscriber station to be called, the redirection information mentioned above is used to redirect the call signal information from the subscriber station SUB1 just making the call to the previously considered subscriber station SUB2 of the first subnetwork NET1 in the context of a call signal redirection or call signal rerouting operation to the server SVR of the second subnetwork NET2. This redirection can either take place immediately after the call has not been accepted at the specified subscriber station SUB2 to be called or the respective call signal redirection or rerouting operation can only take place a defined time period after non-acceptance of the call at the specified subscriber station SUB2 to be called or only takes place after a defined number of call signals has been emitted to the specified subscriber station SUB2 to be called.

A short message signal is then transmitted from the mentioned server SVR during the course of the information service established for the mentioned station, in the present case the mobile radio device MOF, to the respective defined station, i.e. the mobile radio device MOF, containing at least the subscriber number of the respective calling subscriber station, and the subscriber station SUB1. Preferably the respective short message signal however also contains further information such as the date and time of the respective call that was not accepted at the subscriber station SUB2.

The short message signal fed in the previously considered example to the mobile radio device MOF via the transceiver device TRC can, for example, be a short message as transmitted for some time from and to mobile radio devices under the name SMS or short messaging service.

In addition or as an alternative to the transmission of a short message signal as considered above, this can be sent as an email to a previously defined electronic mailbox that is either set up in the server itself or can be available to the memory MEM shown in the drawing. The respective short message signal can, however, also be stored in a server memory for example of the server SVR just mentioned or a further server. This then allows full retrieval of the short message signals stored in the respective server memory from any station of the existing communication network, for example using one of the personal computers PC1, PC2 shown.

During the course of redirection of the respective short message signal to the station defined by the information service established in each instance, a selection can preferably be made in respect of the subscriber numbers of calling subscriber stations. This can either be a positive selection, by means of which short message signals are transmitted in response to calls with defined subscriber numbers, or a negative selection, by means of which a short message signal is not transmitted in response to calls with defined subscriber numbers. These measures allow the number of short message signals to be transmitted to the respectively specified station to be limited so that the short message signals that are actually of importance in the individual instance are transmitted.

In addition or as an alternative to the selection measures described above, the redirection information occurring within a defined time period in the server SVR can be retrieved from any subscriber station of the communication network, for example from the personal computer PC1 or the personal computer PC2 or from the mobile radio device MOF. This allows an overview to be obtained in a simple manner of call events within a defined time period at a subscriber station, the communication participants of which are not available at said subscriber station.

Given that the respective short message signal comprises at least the subscriber number of the calling subscriber station in each instance, it is expedient to use the subscriber number of the respective calling subscriber station from the short message transmitted to the respectively defined station, such as the mobile radio device MOF, to set up a link from this station or from this mobile radio device to the respective subscriber station that called. This function, known as click-to-dial, thereby facilitates the required link to be set up between at least two communication participants, which could not initially be set up.

The method according to the invention therefore ensures that the station or subscriber station within a communication network, that is defined as the receiving device for the previously considered short message signals, is not disrupted by inconvenient calls (acoustic reports) as a consequence of the establishment of the call signal redirection operation, but can still obtain the necessary information about calling subscriber stations.

It should be pointed out in conclusion that the known signaling method no. 7 deployed in communication networks of the type considered can be used for the transmission of the different explanatory call and call signal redirection signals and the short message signals. However other signaling methods can also be used in principle.

What is claimed is:

1. A method for expediting a signal when a communication participant is not available at a subscriber station of a first subnetwork associated with a communication network, following arrival of a call, destined for the respective subscriber station, to a defined station of a second subnetwork associated with the communication network, which is linked to the respective first subnetwork via at least one transition device and wherein communication links from and to a mobile radio device associated with the respective communication participant are established as radio links, comprising:
    establishing a defined information service, in a server associated with the second subnetwork, that is configured for activation in response to call signal redirection from the first subnetwork to the respective server;

storing, in the first subnetwork, redirection information about the subscriber station of the first subnetwork to which the respective server is assigned for call signal redirection;

using the redirection information to redirect call signal information from a calling subscriber station to the subscriber station of the first subnetwork as a subscriber station to be called, then to the server of the second subnetwork, if the call is not accepted at the subscriber station to be called; and transmitting a short message signal comprising at least the subscriber number of the calling subscriber station from the respective server to the respective defined station.

2. The method according to claim 1, wherein call signal redirection takes place after the call to the subscriber station to be called is not accepted.

3. The method according to claim 1, wherein call signal redirection takes place a defined time period after non-acceptance of the call at the subscriber station to be called.

4. The method according to claim 1, wherein call signal redirection takes place after a specific defined number of call signals has been emitted to the subscriber station to be called.

5. The method according to claim 1, wherein a short message is transmitted to the mobile radio device in the short message signal.

6. The method according to claim 1, wherein an email is sent to a previously defined electronic mailbox as the short message signal.

7. The method according to claim 1, wherein the short message signal is stored in a server memory.

8. The method according to claim 1, wherein a selection is made in respect of the subscriber numbers of calling subscriber stations in response to establishment of the information service in the server.

9. The method according to claim 8, wherein a positive selection is made, according to which a short message signal is transmitted in response to calls with defined subscriber numbers.

10. The method according to claim 8, wherein a negative selection is made, according to which a short message signal is not transmitted in response to calls with defined subscriber numbers.

11. The method according to claim 1, wherein the redirection information occurring in the server within a defined time period is retrieved from subscriber station of the communication network.

12. The method according to claim 1, wherein a subscriber number of a calling subscriber station is included in the short message transmitted during established of the information service to the defined station to set up a link from the station receiving the short message to the respective calling subscriber station.

* * * * *